(12) United States Patent  
Nelson

(10) Patent No.: US 10,567,678 B2  
(45) Date of Patent: Feb. 18, 2020

(54) MULTISPECTRAL CAMERA REPLACEABLE FILTER ARRAY

(71) Applicant: Sentera, Inc., Minneapolis, MN (US)

(72) Inventor: Ryan Lee Nelson, Apple Valley, MN (US)

(73) Assignee: Sentera, Inc., Minneapolis, MN (US)

( * ) Notice: Subject to any disclaimer, the term of this patent is extended or adjusted under 35 U.S.C. 154(b) by 276 days.

(21) Appl. No.: 15/870,571

(22) Filed: Jan. 12, 2018

(65) Prior Publication Data

US 2019/0222779 A1 Jul. 18, 2019

(51) Int. Cl.
| | |
|---|---|
| H04N 5/33 | (2006.01) |
| H04N 5/225 | (2006.01) |
| B64D 47/08 | (2006.01) |
| H04N 5/235 | (2006.01) |
| G02B 7/00 | (2006.01) |
| G01J 3/00 | (2006.01) |
| H04N 9/04 | (2006.01) |

(52) U.S. Cl.
CPC ............. *H04N 5/332* (2013.01); *B64D 47/08* (2013.01); *G01J 3/00* (2013.01); *G02B 7/006* (2013.01); *H04N 5/2254* (2013.01); *H04N 5/2258* (2013.01); *H04N 5/2352* (2013.01); *H04N 9/0455* (2018.08)

(58) Field of Classification Search
CPC .......... B64D 47/08; G01J 3/00; G02B 7/006; H04N 5/2254; H04N 5/2258; H04N 5/2352; H04N 5/332; H04N 9/0455
See application file for complete search history.

(56) References Cited

U.S. PATENT DOCUMENTS

| | | | | |
|---|---|---|---|---|
| 8,836,793 | B1 * | 9/2014 | Kriesel .................. | H04N 9/045 348/164 |
| 2007/0174895 | A1 * | 7/2007 | Zhigang ............... | H04N 5/4401 725/135 |
| 2007/0211164 | A1 * | 9/2007 | Olsen ................... | G02B 3/0062 348/345 |
| 2009/0244355 | A1 * | 10/2009 | Horie ...................... | G02B 5/22 348/340 |
| 2012/0026325 | A1 * | 2/2012 | Bunker .................. | G03B 11/00 348/143 |
| 2015/0172608 | A1 * | 6/2015 | Routhier .............. | H04N 5/2258 348/265 |
| 2015/0181098 | A1 * | 6/2015 | Davis ................... | H04N 5/2256 348/342 |

(Continued)

*Primary Examiner* — Amy R Hsu  
(74) *Attorney, Agent, or Firm* — Hamre, Schumann, Mueller & Larson, P.C.

(57) ABSTRACT

Multispectral cameras may be used for aerial imaging, such as in precision agriculture aerial imaging applications. In particular, multispectral camera mounted on an aerial vehicle may be used to determine vegetative indices of the plants being photographed. A multispectral imaging method may include optically filtering a plurality of images through a plurality of optical image filters within a swappable filter cartridge, receiving the filtered plurality of images at a plurality of image sensors within a multiple image sensor module, each of the plurality of image sensors corresponding to each of the plurality of optical image filters, and storing the received plurality of images at a memory within the multiple image sensor module.

20 Claims, 4 Drawing Sheets

(56) References Cited

U.S. PATENT DOCUMENTS

2015/0358527 A1* 12/2015 Niida .................... G03B 11/00
                                                         348/211.3
2017/0078538 A1* 3/2017 Zhu ..................... H04N 5/2253
2018/0024419 A1* 1/2018 Sheridan ............... G03B 17/12
                                                         348/47

* cited by examiner

MULTISPECTRAL CAMERA REPLACEABLE FILTER ARRAY

TECHNICAL FIELD

Embodiments described herein generally relate to multispectral imagery.

BACKGROUND

Multispectral imagery may be used to capture image data that includes two or more wavelength bands. For example, a multispectral image may be used to capture a visible light passband and an infrared passband. Multispectral imaging may be captured using a multiband optical filter that allows light from two or more passbands while attenuating or rejecting light frequencies outside of those bands (e.g., rejecting stopband frequencies). However, these multiband optical filters may include unintentional passband attenuation or decreased performance in stopband attenuation (e.g., decreased filter roll-off performance). What is needed is an improved multispectral image device for multispectral imagery.

DESCRIPTION OF EMBODIMENTS

The present subject matter provides a technical solution for various technical problems associated with multispectral imagery. To provide desired performance in capturing multispectral images, multiple image sensors (e.g., cameras) are used to capture images, where a distinct optical filter is attached to each image sensor. By using distinct optical filters with associated single-band optical filter characteristics, the resulting multispectral imaging system improves optical filter performance, such as by improving passband performance and stopband attenuation.

Multispectral cameras may be used for aerial imaging, such as in precision agriculture aerial imaging applications. In particular, multispectral camera mounted on an aerial vehicle may be used to determine vegetative indices of the plants being photographed. In an example, a multispectral imaging device may capture visible light and near-infrared light, and image analysis may be used to generate a map of the Normalized Difference Vegetation Index (NDVI) of healthy vegetation based on the multispectral image. Multispectral imaging may be used within various other imagery analysis applications, as described herein.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
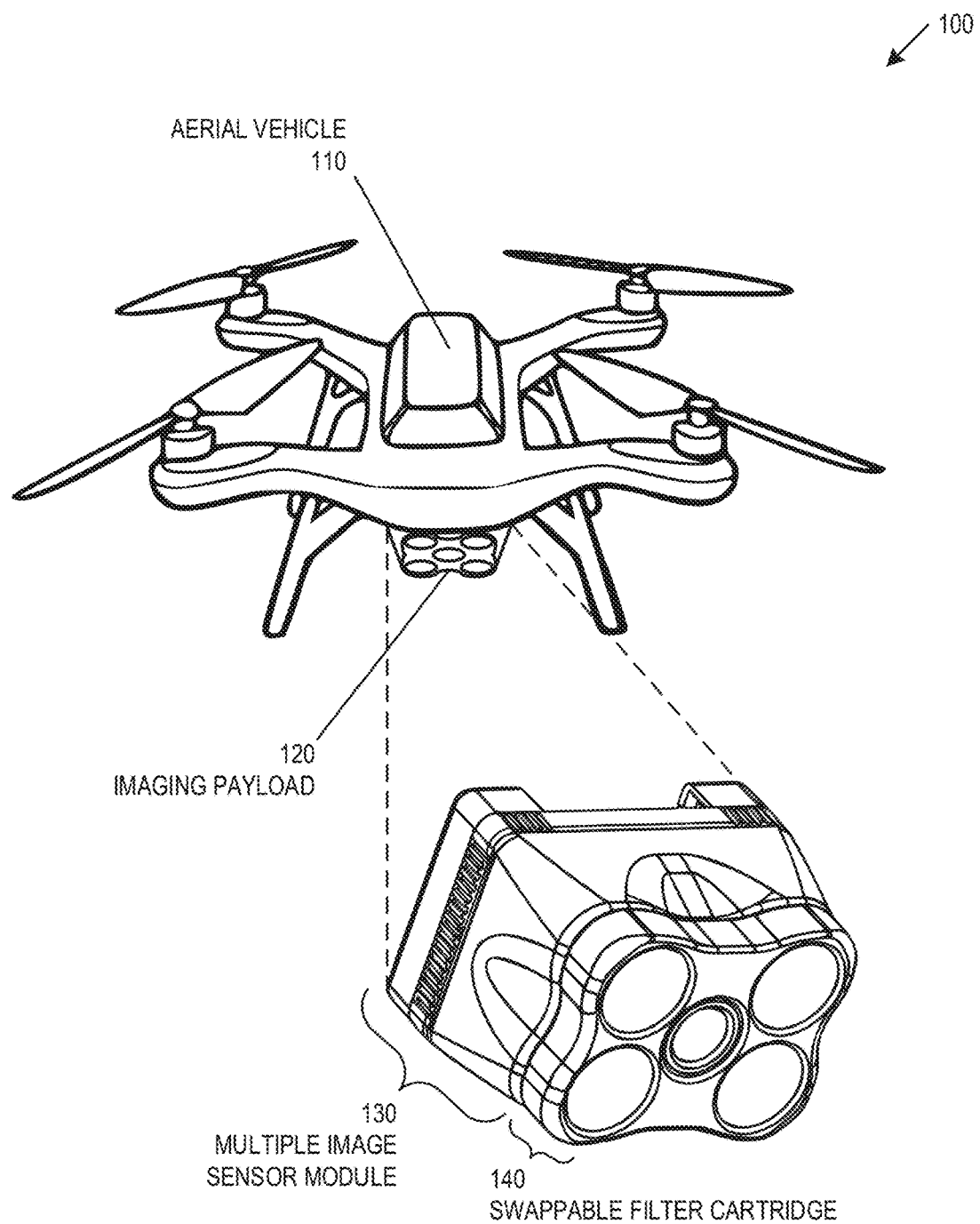
FIG. 1 is a perspective diagram of a multispectral imaging vehicle, in accordance with at least one embodiment.

FIG. 1 is a perspective diagram of a multispectral imaging vehicle 100, in accordance with at least one embodiment. The multispectral imaging vehicle 100 includes an aerial vehicle 110 on which a multispectral imaging payload 120 is mounted. The multispectral imaging payload 120 includes a multiple image sensor module 130, which includes multiple image sensors. The multispectral imaging payload 120 also includes a swappable filter cartridge 140. The swappable filter cartridge 140 includes an optical filter corresponding to one or more of the image sensors within the image sensor module 130. For example, each of the image sensors may include full spectrum image sensors (e.g., red-green-blue (RGB) sensor), and the swappable filter cartridge 140 may include an optical filter for three of the four image sensors within the image sensor module 130. The multispectral imaging payload 120 may include four image sensors and four corresponding optical filters, however other numbers of image sensors and optical filters may be used.

The swappable filter cartridge 140) may be mounted to the image sensor module 130, such as using a screw attachment, a magnetic attachment, or another attachment. The mounting may be configured to allow for switching cartridge 140 with another cartridge. Each swappable filter cartridge 140 may include a specific combination of optical filters. For example, filter cartridge 140 configured for NDVI imagery may include four optical filters corresponding to a red light band, a blue light band, a green light band, and a near-infrared (NIR) light band. The swappable filter cartridge 140 allows a user to swap between various combinations of light bands, which may be used to switch the imaging payload 120 among various vegetative indices. The swappable filter cartridge 140 provides a small and cost-effective multispectral sensor, especially when contrasted with maintaining an inventory of expensive imaging payloads corresponding to each different combination of light bands. For example, if an agricultural researcher identifies a new combination of optical bands that provides an improved detection of a particular invasive species, one or more multispectral imaging vehicles 100 may be modified quickly by installing a swappable filter cartridge 140 with the new combination of optical bands. Additionally, by providing a smaller and simpler swappable filter cartridge 140, the imaging payload 120 also improves aerial vehicle dynamic performance and extends aerial vehicle flight time.

Figure 2:
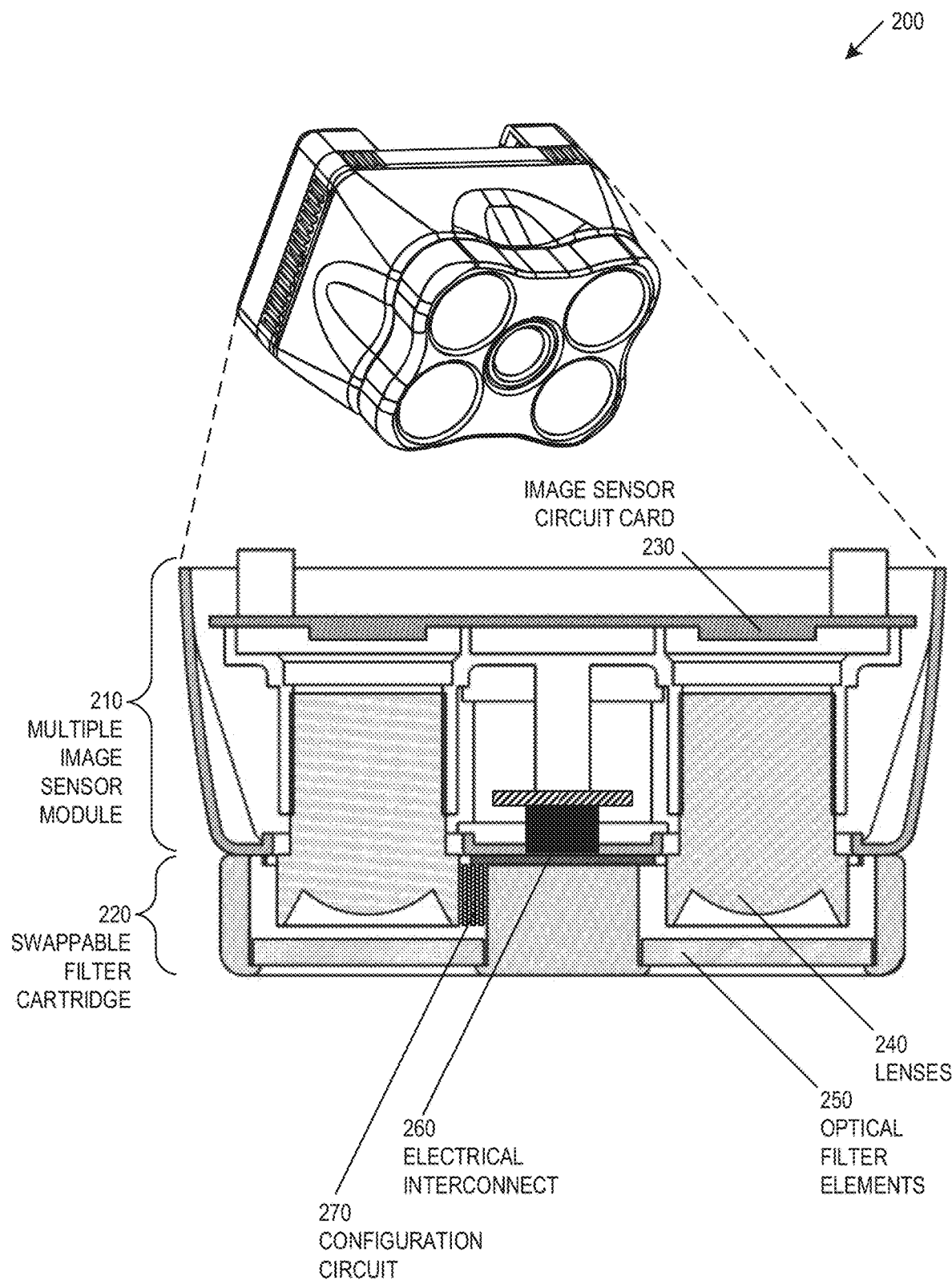
FIG. 2 is a perspective diagram of a multispectral imaging device, in accordance with at least one embodiment.

FIG. 2 is a perspective diagram of a multispectral imaging device 200, in accordance with at least one embodiment. The multispectral imaging device 200 includes a multiple image sensor module 210 and a swappable filter cartridge 220. The multiple image sensor module 210 includes an image sensor circuit card 230, which provides mechanical and electrical support for multiple image sensors. The multiple image sensor module 210 also includes multiple optical lenses 240, where each optical lens may be used to focus an image on each of the multiple image sensors. The swappable filter cartridge 220 includes multiple optical filter elements 250, where each optical filter element may be used to filter a light band through a corresponding lens 240 to a corresponding image sensor. By attaching the optical filter elements 250 to the distal end of the lenses 240, various in-chamber contamination (e.g., dirt, lint) may be reduced or eliminated, such as contamination that would otherwise be introduced if the optical filter elements 250 were positioned between the image sensor circuit card 230 and the lenses. The attachment of the optical filter elements 250 to the distal end of the lenses 240 also provides a consistent focal distance, which reduces or eliminates the need for recalibrating the focal distance caused by inserting various filters with different indices of refraction between the lens 240 and image sensor circuit card 230. The materials and optical characteristics (e.g., different thickness, different filter material, different reflective coating materials) of the optical filter elements 250 may be selected to provide for various optical characteristics while maintaining a consistent focal distance.

The swappable filter cartridge 220 may include an electrical interconnect 260, which provides an electrical connection between the swappable filter cartridge 220 and the multiple image sensor module 210, electrical interconnect 260 may be used to provide power to the swappable filter cartridge 220, which may be used to power one or more electrical or electromechanical components within the swappable filter cartridge 220. For example, the swappable filter cartridge 220 may include a shutter to adjust exposure or actuator to adjust the optical filter elements 250 relative to the lenses 240, such as a microelectromechanical system (MEMS) actuator. The electrical interconnect 260 may provide a communication path between the swappable filter cartridge 220 and the multiple image sensor module 210.

This communication through the electrical interconnect 260 may take place using a fixed connector, a blind mate connector, a wireless connection, or other communication connector. In an example, the swappable filter cartridge 220 includes a configuration circuit 270 that conveys configuration data through the electrical interconnect 260 to the multiple image sensor module 210. The configuration circuit 270 may provide an active communication link to convey configuration data, such as a processor and wired communication circuit, a near-field communication (NFC) circuit, or other active communication circuit. The configuration circuit 270 may provide a passive communication link to convey configuration data, such as a passive memory device (e.g., erasable programmable read-only memory (EPROM)), a specific combination of resistors, or other passive circuit.

The swappable filter cartridge 220 may use the electrical interconnect 260 to communicate configuration data for the optical filter elements 250 to the multiple image sensor module 210. The configuration data may provide information used by the multiple image sensor module 210 to reconfigure various image capture parameters according to the number and type of optical filter elements 250, such as adjusting exposure time, exposure gain, auto-exposure parameters, or other image capture parameters. For example, a narrowband optical image filter may have an associated exposure and gain that is less than a wideband filter exposure and gain. Because each combination of optical filter elements 250 has an associated set of image capture parameters, this communication of configuration data would reduce or eliminate user intervention in reconfiguring the multiple image sensor module 210 each time the swappable filter cartridge 220 is changed. The configuration data may also be used to provide information about the swappable filter cartridge, such as spectral information about the optical filter elements 250. This information may be used as an information "tag" of data that is associated with each image that is captured and stored, such as tagging each image with aperture size, exposure time, or the spectral information corresponding to each of the optical filter elements 250. The configuration data may provide information used by the multiple image sensor module 210 to process captured images. For example, a particular vegetation index may have an associated equation that is used to combine data from one or more of the captured spectral images, and the configuration data may provide the associated equation or equation coefficients corresponding to a that vegetation index. By using the configuration data to process captured images, the multiple image sensor module 210 may output both the raw image data from each of the captured images and the processed data, such as providing a processed NDVI image output. The configuration data may include additional information about the physical configuration of the image capture devices, such as the angle by which each of the captured images is offset from a bore sighted image. The physical configuration data may be used to provide information about how the images may be combined, such as combining images through stitching or aligning one or more optical spectra to each other.

While NDVI is a common agricultural index, the multispectral systems and methods described herein can be applied to other indices, such as Atmospherically Resistant Vegetation Index (ARVI), Visible Atmospherically Resistant Index (VARI), Enhanced Normalized Difference Vegetation Index (ENDVI), Soil-Adjusted Vegetation Index (SAVI), Optimized Soil Adjusted Vegetation Index (OSAVI), Renormalized Difference Vegetation Index (RDVI), or other indices. Additionally, while the systems and methods described herein refer to imagery-based outputs, other encoded geographical information file formats may be used, such as vector graphics (e.g., GIS Shapefile), raster graphics, grid formats, or other geographical file formats. While these multispectral imaging systems and methods are described herein with respect to NDVI-based agricultural analysis, these index-based analysis techniques are applicable to other areas, including military, urban development studies, forestry, other remote sensing indices, and other fields that uses remote sensing.

Figure 3:
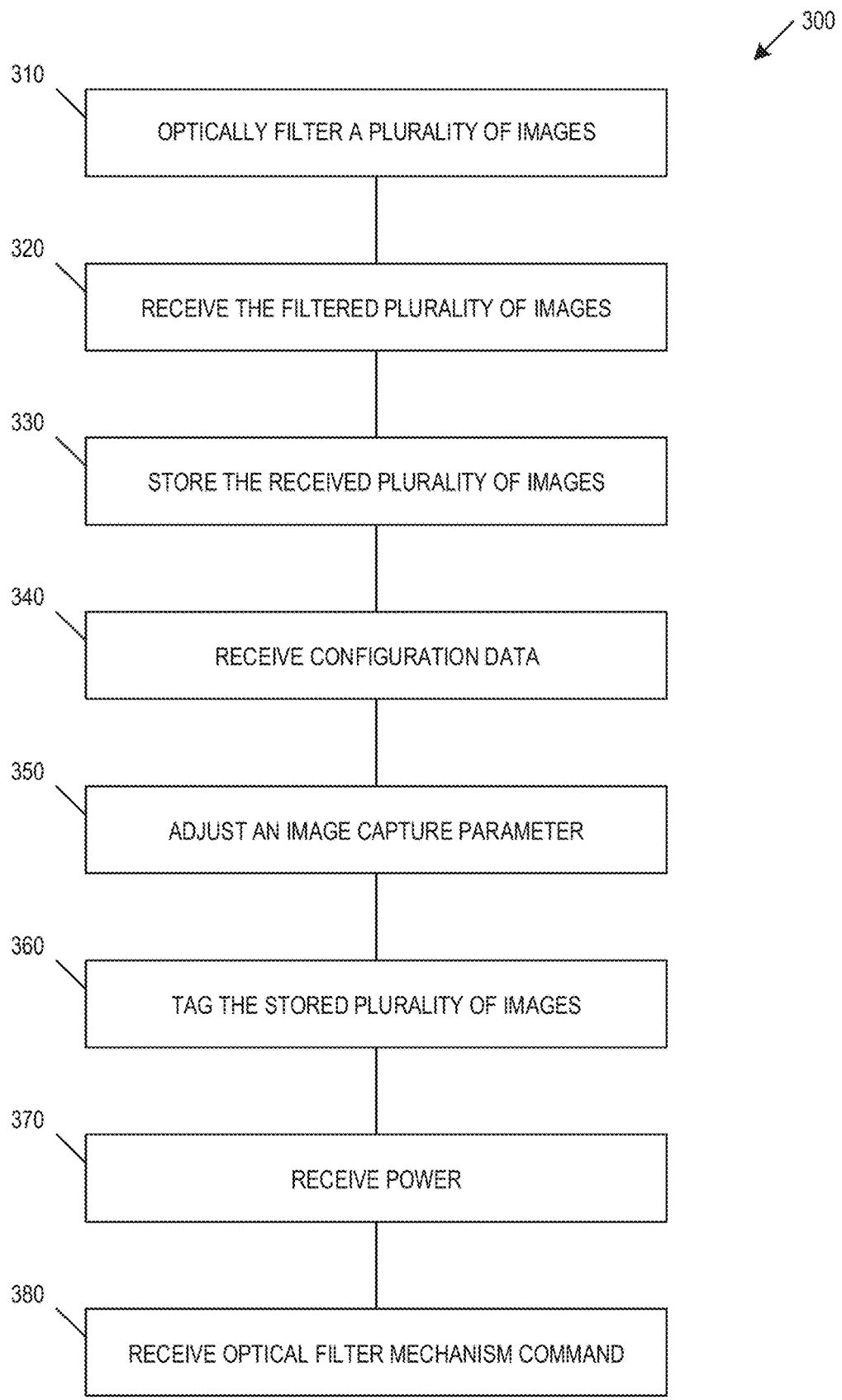
FIG. 3 is a multispectral imaging method, according to an example embodiment.

FIG. 3 is a multispectral imaging method 300, according to an example embodiment. Method 300 may include optically filtering a plurality of images 310, such as through a plurality of optical image filters within a swappable filter cartridge. Method 300 may include receiving the filtered plurality of images 320 at a plurality of image sensors within a multiple image sensor module. Each of the plurality of image sensors may correspond to each of the plurality of optical image filters. Method 300 may include storing the received plurality of images 330, such as at a memory within the multiple image sensor module.

Method 300 may include receiving configuration data 340. The configuration data may be received from the swappable filter cartridge through an electrical interconnect at the multiple image sensor module. The configuration data may be received from a configuration circuit within the swappable filter cartridge. Method 300 may include adjusting an image capture parameter 350 within the multiple image sensor module based on the received configuration data. The image capture parameter may include an exposure time, an exposure gain, or other image capture parameter.

Method 300 may include tagging the stored plurality of images 360 with a plurality of image tag data based on the received configuration data. The image tag data may include an optical filter bandwidth, a vegetation index type, and exposure duration, a geographic location, an image capture date, an image capture time, a sun elevation angle, a wind speed, a wind direction, a velocity vector, or other tag data.

Method 300 may include receiving power 370 from the multiple image sensor module at the swappable filter cartridge. Method 300 may include receiving a command to adjust an optical filter mechanism 380 from the multiple image sensor module at the swappable filter cartridge. The optical filter mechanism may include a shutter, an actuator, or another optical filter mechanism.

Figure 4:
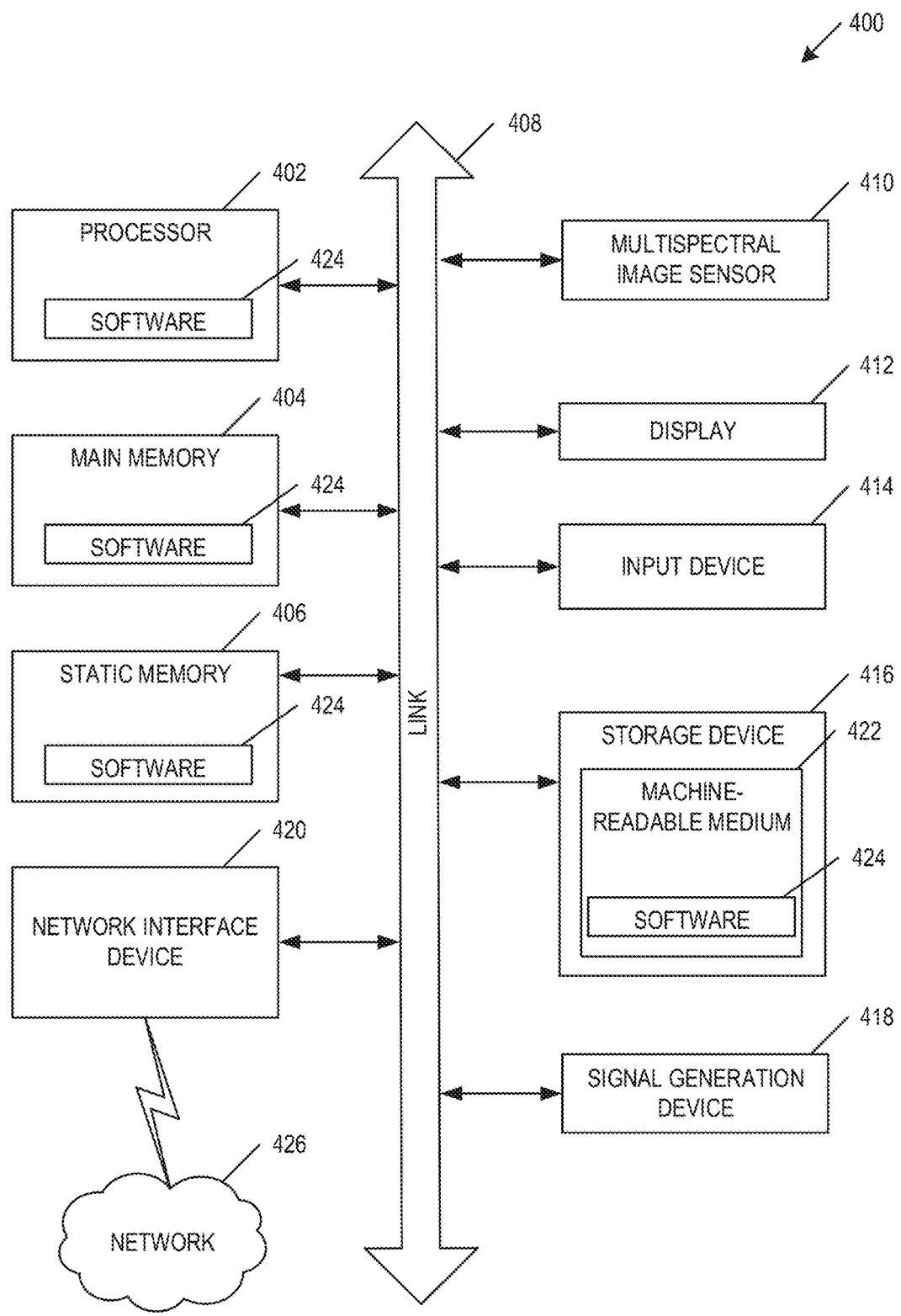
FIG. 4 is a block diagram illustrating a multispectral imagery system in an example form of an electronic device, according to an example embodiment.

FIG. 4 is a block diagram illustrating a multispectral imagery system in an example form of an electronic device 400, within which a set or sequence of instructions may be executed to cause the machine to perform any one of the methodologies discussed herein, according to an example embodiment. Electronic device 400 may represent an index survey vehicle, or may represent an electronic device on which the index analysis occurs. In alternative embodiments, the electronic device 400 operates as a standalone device or may be connected (e.g., networked) to other machines. In a networked deployment, the electronic device 400 may operate in the capacity of either a server or a client machine in server-client network environments, or it may act as a peer machine in peer-to-peer (or distributed) network environments. The electronic device 400 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 400 capable of executing instructions (sequential or otherwise) that specify actions to be taken by that machine to detect a user input. Further, while only a single electronic device 400 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The main memory 404 or static memory 406 may be used to store navigation data (e.g., predetermined waypoints) or payload data (e.g., stored captured images).

The electronic device 400 includes a multispectral image sensor 410, such as shown in FIGS. 1-2. The electronic device 400 may further include a display unit 412, where the display unit 412 may include a single component that provides a user-readable display and a protective layer, or another display type. The electronic device 400 may further include an input device 414, such as a pushbutton, a keyboard, or a user interface (UI) navigation device (e.g., a mouse or touch-sensitive input). The electronic device 400 may additionally include a storage device 416, such as a drive unit. The electronic device 400 may additionally include an image capture device 418 to provide to capture one or more images for processing as described above. The electronic device 400 may additionally include a network interface device 420, and one or more additional sensors (not shown).

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, or within the processor 402 during execution thereof by the electronic device 400. The main memory 404, static memory 406, and the processor 402 may also constitute machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a multispectral imaging system comprising: a swappable optical filter cartridge including an electrical interconnect and a plurality of optical image filters; and a multispectral image sensor device including a plurality of image sensors, each of the plurality of image sensors corresponding to each of the plurality of optical image filters, the multispectral image sensor device configured to: receive configuration data from the swappable optical filter cartridge through the electrical interconnect; adjust an image capture parameter within the multispectral image sensor device based on the received configuration data; and receive a filtered plurality of images at the plurality of image sensors within the multispectral image sensor device.

In Example 2, the subject matter of Example 1 optionally includes wherein the image capture parameter includes at least one parameter selected from the group comprising an exposure time and an exposure gain.

In Example 3, the subject matter of any one or more of Examples 1-2 optionally include the multispectral image sensor device further configured to receive the configuration data from a configuration circuit within the swappable optical filter cartridge.

In Example 4, the subject matter of any one or more of Examples 1-3 optionally include the multispectral image sensor device further configured to tag the stored plurality of images with a plurality of image tag data based on the received configuration data.

In Example 5, the subject matter of Example 4 optionally includes wherein the plurality of image tag data includes at least one tag data set selected from the group comprising an optical filter bandwidth, a vegetation index type, and exposure duration, a geographic location, an image capture date, an image capture time, a sun elevation angle, a wind speed, a wind direction, and a velocity vector.

In Example 6, the subject matter of any one or more of Examples 1-5 optionally include the swappable optical filter cartridge configured to receive power from the multispectral image sensor device.

In Example 7, the subject matter of any one or more of Examples 1-6 optionally include the swappable optical filter cartridge further configured to receive a command to adjust an optical filter mechanism from the multispectral image sensor device.

In Example 8, the subject matter of Example 7 optionally includes wherein the optical filter mechanism includes at least one mechanism selected from the group comprising a mechanical shutter and a mechanical actuator.

Example 9 is a multispectral imaging method comprising: receiving configuration data at a multispectral image sensor device from a swappable optical filter cartridge through an electrical interconnect; adjusting an image capture parameter within the multispectral image sensor device based on the received configuration data; optically filtering a plurality of images through a plurality of optical image filters within the swappable optical filter cartridge; and receiving the filtered plurality of images at a plurality of image sensors within the multispectral image sensor device, each of the plurality of image sensors corresponding to each of the plurality of optical image filters.

In Example 10, the subject matter of Example 9 optionally includes wherein the image capture parameter includes at least one parameter selected from the group comprising an exposure time and an exposure gain.

In Example 11, the subject matter of any one or more of Examples 9-10 optionally include receiving the configuration data from a configuration circuit within the swappable optical filter cartridge.

In Example 12, the subject matter of any one or more of Examples 9-11 optionally include tagging the stored plurality of images with a plurality of image tag data based on the received configuration data.

In Example 13, the subject matter of Example 12 optionally includes wherein the plurality of image tag data includes at least one tag data set selected from the group comprising an optical filter bandwidth, a vegetation index type, and exposure duration, a geographic location, an image capture date, an image capture time, a sun elevation angle, a wind speed, a wind direction, and a velocity vector.

In Example 14, the subject matter of any one or more of Examples 9-13 optionally include receiving power from the multispectral image sensor device at the swappable optical filter cartridge.

In Example 15, the subject matter of any one or more of Examples 9-14 optionally include receiving a command to adjust an optical filter mechanism from the multispectral image sensor device at the swappable optical filter cartridge.

In Example 16, the subject matter of Example 15 optionally includes wherein the optical filter mechanism includes at least one mechanism selected from the group comprising a mechanical shutter and a mechanical actuator.

Example 17 is at least one machine-readable medium including instructions, which when executed by a computing system, cause the computing system to perform any of the methods of Examples 9-16.

Example 18 is an apparatus comprising means for performing any of the methods of Examples 9-16.

Example 19 is at least one non-transitory machine-readable storage medium, comprising a plurality of instructions that, responsive to being executed with processor circuitry of a computer-controlled device, cause the computer-controlled device to: receive configuration data at a multispectral image sensor device from a swappable optical filter cartridge through an electrical interconnect; adjust an image capture parameter within the multispectral image sensor device based on the received configuration data; optically filter a plurality of images through a plurality of optical image filters within the swappable optical filter cartridge; and receive the filtered plurality of images at a plurality of image sensors within the multispectral image sensor device, each of the plurality of image sensors corresponding to each of the plurality of optical image filters.

In Example 20, the subject matter of Example 19 optionally includes wherein the image capture parameter includes at least one parameter selected from the group comprising an exposure time and an exposure gain.

In Example 21, the subject matter of any one or more of Examples 19-20 optionally include the instructions further causing the computer-controlled device to receive the configuration data from a configuration circuit within the swappable optical filter cartridge.

In Example 22, the subject matter of any one or more of Examples 19-21 optionally include the instructions further causing the computer-controlled device to tag the stored plurality of images with a plurality of image tag data based on the received configuration data.

In Example 23, the subject matter of Example 22 optionally includes wherein the plurality of image tag data includes at least one tag data set selected from the group comprising an optical filter bandwidth, a vegetation index type, and exposure duration, a geographic location, an image capture date, an image capture time, a sun elevation angle, a wind speed, a wind direction, and a velocity vector.

In Example 24, the subject matter of any one or more of Examples 19-23 optionally include the instructions further causing the computer-controlled device to receive power from the multispectral image sensor device at the swappable optical filter cartridge.

In Example 25, the subject matter of any one or more of Examples 19-24 optionally include the instructions further causing the computer-controlled device to receive a command to adjust an optical filter mechanism from the multispectral image sensor device at the swappable optical filter cartridge.

In Example 26, the subject matter of Example 25 optionally includes wherein the optical filter mechanism includes at least one mechanism selected from the group comprising a mechanical shutter and a mechanical actuator.

Example 27 is a multispectral imaging apparatus comprising: means for receiving configuration data at a multispectral image sensor device from a swappable optical filter cartridge through an electrical interconnect; means for adjusting an image capture parameter within the multispectral image sensor device based on the received configuration data; means for optically filtering a plurality of images through a plurality of optical image filters within the swappable optical filter cartridge; and means for receiving the filtered plurality of images at a plurality of image sensors within the multispectral image sensor device, each of the plurality of image sensors corresponding to each of the plurality of optical image filters.

In Example 28, the subject matter of Example 27 optionally includes wherein the image capture parameter includes at least one parameter selected from the group comprising an exposure time and an exposure gain.

In Example 29, the subject matter of any one or more of Examples 27-28 optionally include means for receiving the configuration data from a configuration circuit within the swappable optical filter cartridge.

In Example 30, the subject matter of any one or more of Examples 27-29 optionally include means for tagging the stored plurality of images with a plurality of image tag data based on the received configuration data.

In Example 31, the subject matter of Example 30 optionally includes wherein the plurality of image tag data includes at least one tag data set selected from the group comprising an optical filter bandwidth, a vegetation index type, and exposure duration, a geographic location, an image capture date, an image capture time, a sun elevation angle, a wind speed, a wind direction, and a velocity vector.

In Example 32, the subject matter of any one or more of Examples 27-31 optionally include means for receiving power from the multispectral image sensor device at the swappable optical filter cartridge.

In Example 33, the subject matter of any one or more of Examples 27-32 optionally include means for receiving a command to adjust an optical filter mechanism from the multispectral image sensor device at the swappable optical filter cartridge.

In Example 34, the subject matter of Example 33 optionally includes wherein the optical filter mechanism includes at least one mechanism selected from the group comprising a mechanical shutter and a mechanical actuator.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A multispectral imaging system comprising:
a swappable optical filter cartridge including an electrical interconnect and a plurality of optical image filters; and
a multispectral image sensor device including a plurality of image sensors, each of the plurality of image sensors corresponding to each of the plurality of optical image filters, the multispectral image sensor device configured to:
receive configuration data from the swappable optical filter cartridge through the electrical interconnect;
adjust an image capture parameter within the multispectral image sensor device based on the received configuration data; and
receive a filtered plurality of images at the plurality of image sensors within the multispectral image sensor device.

2. The system of claim 1, wherein the image capture parameter includes at least one parameter selected from the group comprising an exposure time and an exposure gain.

3. The system of claim 1, the multispectral image sensor device further configured to receive the configuration data from a configuration circuit within the swappable optical filter cartridge.

4. The system of claim 1, the multispectral image sensor device further configured to tag the stored plurality of images with a plurality of image tag data based on the received configuration data.

5. The system of claim 4, wherein the plurality of image tag data includes at least one tag data set selected from the group comprising an optical filter bandwidth, a vegetation index type, and exposure duration, a geographic location, an image capture date, an image capture time, a sun elevation angle, a wind speed, a wind direction, and a velocity vector.

6. The system of claim 1, the swappable optical filter cartridge configured to receive power from the multispectral image sensor device.

7. The system of claim 1, the swappable optical filter cartridge further configured to receive a command to adjust an optical filter mechanism from the multispectral image sensor device.

8. The system of claim 7, wherein the optical filter mechanism includes at least one mechanism selected from the group comprising a mechanical shutter and a mechanical actuator.

9. A multispectral imaging method comprising:
receiving configuration data at a multispectral image sensor device from a swappable optical filter cartridge through an electrical interconnect;

adjusting an image capture parameter within the multispectral image sensor device based on the received configuration data;
optically filtering a plurality of images through a plurality of optical image filters within the swappable optical filter cartridge; and
receiving the filtered plurality of images at a plurality of image sensors within the multispectral image sensor device, each of the plurality of image sensors corresponding to each of the plurality of optical image filters.

10. The method of claim 9, wherein the image capture parameter includes at least one parameter selected from the group comprising an exposure time and an exposure gain.

11. The method of claim 9, further including receiving the configuration data from a configuration circuit within the swappable optical filter cartridge.

12. The method of claim 9, further including tagging the stored plurality of images with a plurality of image tag data based on the received configuration data.

13. The method of claim 12, wherein the plurality of image tag data includes at least one tag data set selected from the group comprising an optical filter bandwidth, a vegetation index type, and exposure duration, a geographic location, an image capture date, an image capture time, a sun elevation angle, a wind speed, a wind direction, and a velocity vector.

14. The method of claim 9, further including receiving power from the multispectral image sensor device at the swappable optical filter cartridge.

15. The method of claim 9, further including receiving a command to adjust an optical filter mechanism from the multispectral image sensor device at the swappable optical filter cartridge.

16. The method of claim 15, wherein the optical filter mechanism includes at least one mechanism selected from the group comprising a mechanical shutter and a mechanical actuator.

17. At least one non-transitory machine-readable storage medium, comprising a plurality of instructions that, responsive to being executed with processor circuitry of a computer-controlled device, cause the computer-controlled device to:
receive configuration data at a multispectral image sensor device from a swappable optical filter cartridge through an electrical interconnect;
adjust an image capture parameter within the multispectral image sensor device based on the received configuration data;
optically filter a plurality of images through a plurality of optical image filters within the swappable optical filter cartridge; and
receive the filtered plurality of images at a plurality of image sensors within the multispectral image sensor device, each of the plurality of image sensors corresponding to each of the plurality of optical image filters.

18. The machine-readable storage medium of claim 17, wherein the image capture parameter includes at least one parameter selected from the group comprising an exposure time and an exposure gain.

19. The machine-readable storage medium of claim 17, the instructions further causing the computer-controlled device to receive the configuration data from a configuration circuit within the swappable optical filter cartridge.

20. The machine-readable storage medium of claim 17, the instructions further causing the computer-controlled device to tag the stored plurality of images with a plurality of image tag data based on the received configuration data.

* * * * *